United States Patent
Shibata

(10) Patent No.: US 7,180,620 B2
(45) Date of Patent: Feb. 20, 2007

(54) SYSTEM FOR REPORTING STATUS OF AND OFFERING SERVICE TO AN IMAGE COMMUNICATION TERMINAL

(75) Inventor: Hiroshi Shibata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 982 days.

(21) Appl. No.: 10/017,519

(22) Filed: Dec. 14, 2001

(65) Prior Publication Data
US 2002/0097444 A1 Jul. 25, 2002

(30) Foreign Application Priority Data
Jan. 19, 2001 (JP) ............ 2001-011837

(51) Int. Cl.
G06F 15/00 (2006.01)

(52) U.S. Cl. ............ 358/1.15; 358/402; 358/440; 379/93.24; 709/206; 709/223; 709/226

(58) Field of Classification Search ........... 358/402, 358/440, 1.15; 379/93.24; 709/223, 226, 709/206
See application file for complete search history.

(56) References Cited

U.S. PATENT DOCUMENTS 6,370,341 B1 * 4/2002 Haines ............ 399/24
6,892,317 B1 * 5/2005 Sampath et al. ............ 714/4

FOREIGN PATENT DOCUMENTS

| JP | 2-51968 | 2/1990 |
|---|---|---|
| JP | 7170357 | 6/1995 |
| JP | 10207304 | 8/1998 |

\* cited by examiner

Primary Examiner—David Moore
Assistant Examiner—Michael Burleson
(74) Attorney, Agent, or Firm—Cooper & Dunham LLP

(57) ABSTRACT

A system for reporting status of and offering service to an image communication terminal is provided. The system includes an image communication terminal, a manager personal computer connected to the image communication terminal via a network, and a service center connected to the image communication terminal via the network. The image communication terminal includes a registering part for registering an e-mail address of the manager, an e-mail address of the service center and identification information of the image communication terminal, an e-mail controlling part for exchanging e-mails via the network and a status detecting part for detecting statuses of the image communication terminal.

26 Claims, 12 Drawing Sheets

FIG.2

| TERMINAL INFORMATION | SERIAL NO. | 0987654321 |
| --- | --- | --- |
| | E-MAIL ADDRESS | fax@abc.com |
| | FAX NO. | 123-4567 |
| ADDRESSER INFO | | ABC SYSTEMS CO.LTD. BUSINESS DEPT. |
| MANAGER INFO | E-MAIL ADDRESS | manager@abc.com |
| SERVICE CENTER INFO | E-MAIL ADDRESS | service@aaa.com |
| | FAX NO. | 555-6666 |

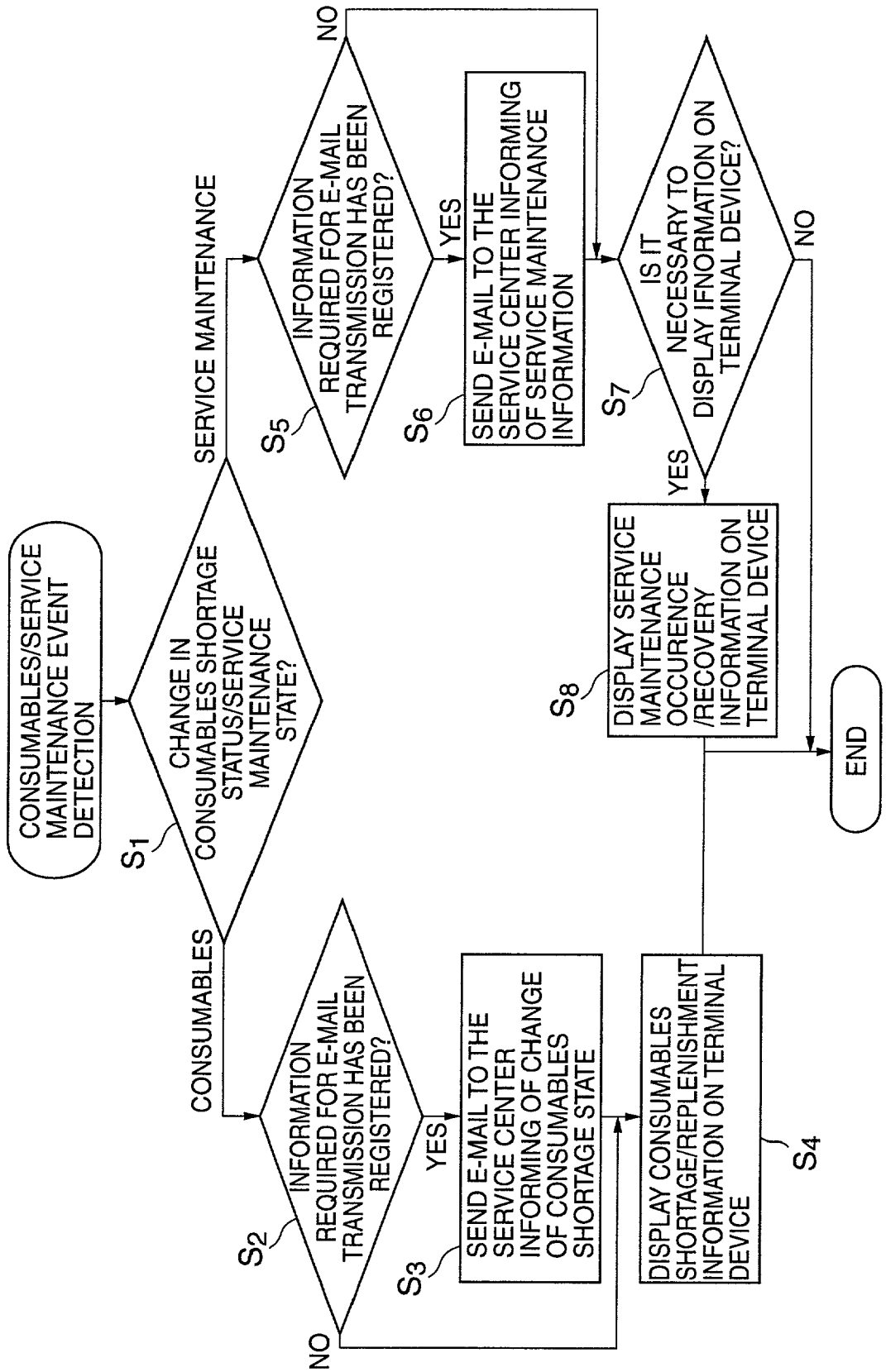

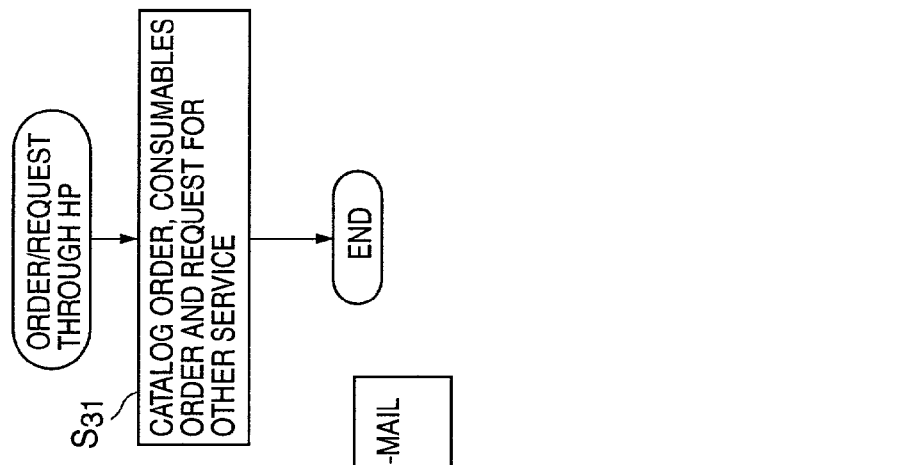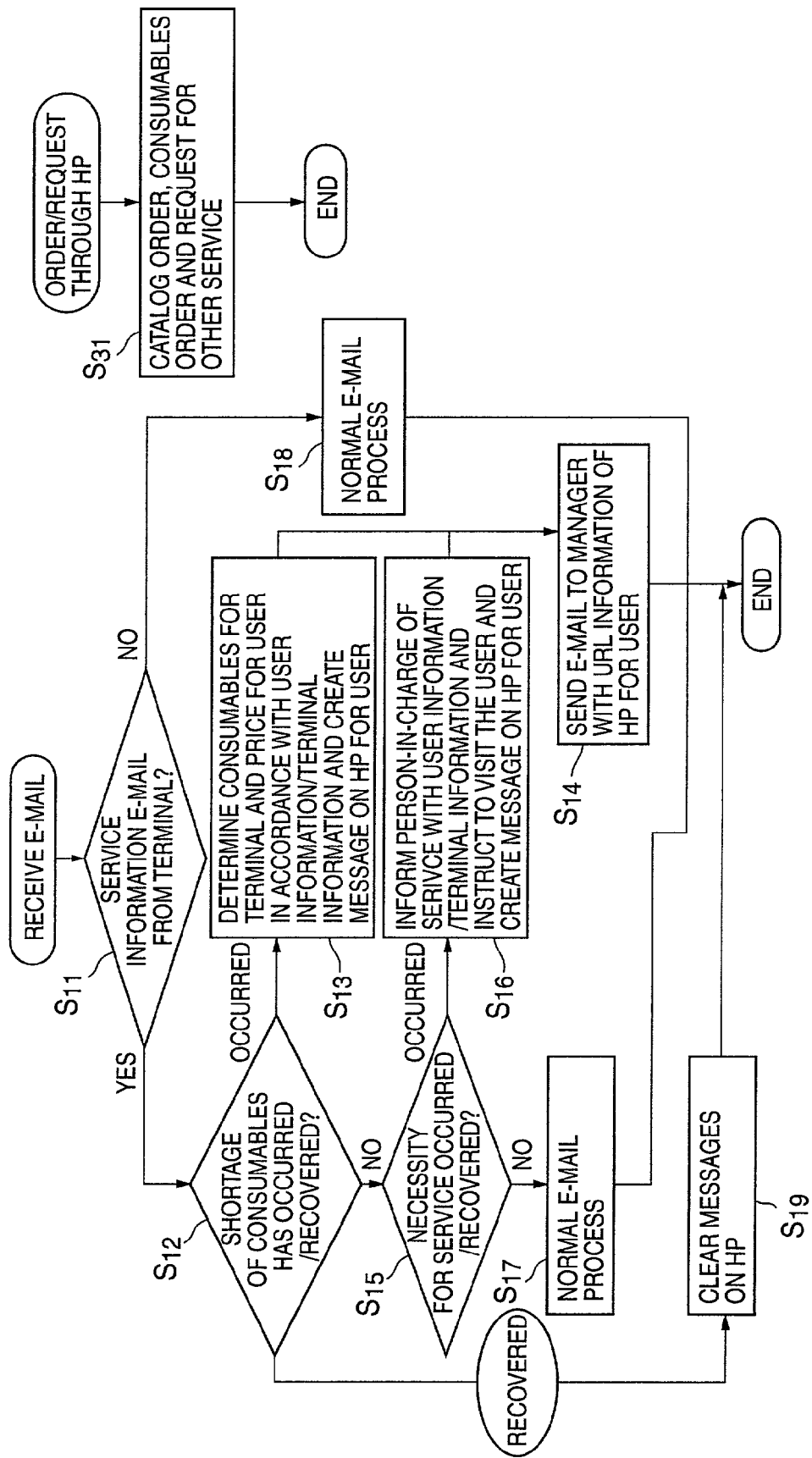

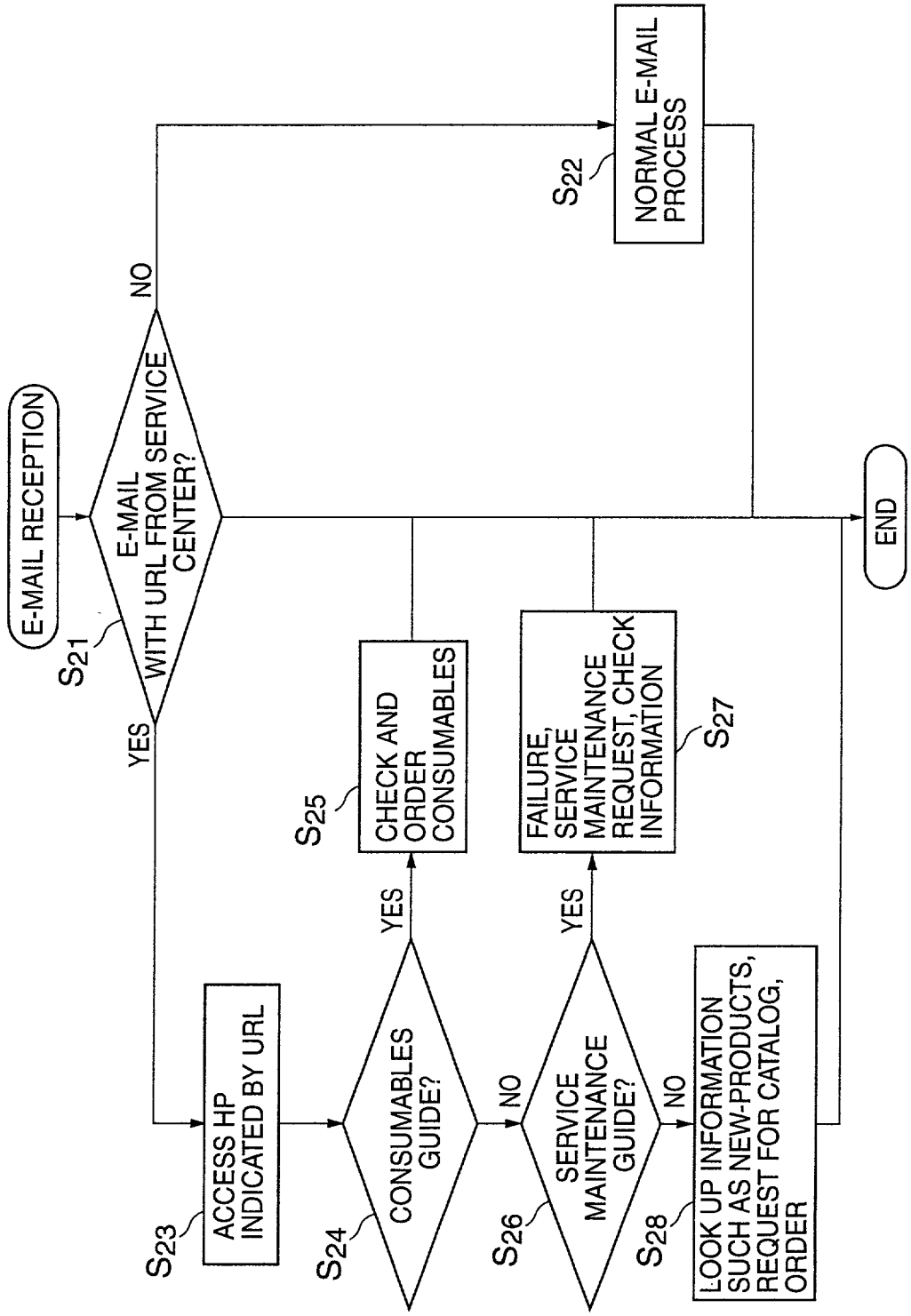

FIG.6

■ PLEASE REPLENISH TONER
TRANSMISSION NOW POSSIBLE

To : service@aaa.com
From : fax@abc.com
Subject : SERVICE MAINTENANCE INFORMATION
===========================================

SERVICE MAINTENANCE INFORMATION
REPLACE CONSUMABLE ARTICLE : TONER SHORTAGE OCCURRED ← (CHANGES TO RECOVERY UPON RECOVERY

NAME OF CONSUMABLE ARTICLE : TONER TYPE 2
  SERVICE CALL : --
  ERROR CODE : --

COUNTER INFORMATION
  WRITE COUNTER : 15045
  READ COUNTER : 16403
  TRANSMISSION COUNTER : 13002
  RECEPTION COUNTER : 12034

USER INFORMATION
  USER MANAGER E-MAIL : manager@abc.com

TERMINAL INFORMATION
  SERIAL No. : 0987654321

■ HEATER OUT OF ORDER　CANNOT PRINT OUT
TRANSMISSION NOW POSSIBLE

To : service@aaa.com
From : fax@abc.com
Subject : SERVICE MAINTENANCE INFORMATION SERVICE MAINTENANCE INFORMATION
　REPLACE OF CONSUMABLE ARTICLE : --
　NAME OF CONSUMABLE ARTICLE : --
　SERVICE CALL : HEATER ERROR OCCURRED ← (CHANGES TO RECOVERY UPON RECOVERY
　ERROR CODE : 5-51

COUNTER INFORMATION
　WRITE COUNTER : 15045
　READ COUNTER : 16403
　TRANSMISSION COUNTER : 13002
　RECEPTION COUNTER : 12034

USER INFORMATION
　USER MANAGER E-MAIL : manager@abc.com

TERMINAL INFORMATION
　SERIAL No. : 09876543211
　...

FIG.8

To : manager@abc.com
From : service@aaa.com
Subject : AAA CO. LTD. SERVICE INFORMATION Sirs,
We inform you that your facsimile ML4500 is in short of toner.
Please see homepage indicated by the URL indicated below for more details of ordering procedure and prices of the toner.

http://www.aaa.com/service/abc

Truly yours,

FIG.9

To : manager@abc.com
From : service@aaa.com
Subject : AAA CO. LTD. SERVICE INFORMATION
==========================================

Sirs,
We inform you that your facsimile ML4500 has a failure in the heater.
Please see homepage indicated by the URL indicated below for more details
of maintenance and repairs of the heater.

http://www.aaa.com/service/abc

Truly yours,

FIG.10

<TITLE>
    INFORMATION FROM AAA CO.LTD.

<MESSAGE>
    We inform you that your facsimile ML4500 is in short of toner.
    Types and purchasing prices of the toner are as follows:

[DISPLAY PHOTOS AND PRICES]

To order toner, please specify an amount and press button below.

[DISPLAY AMOUNT AND BUTTON]

Time and date of delivery is as follow:

[TIME AND DATE OF DELIVERY]

<GUIDES>
    [NEW-PRODUCT INFORMATION]

[CAMPAIGN INFORMATION]

FIG.11

<TITLE>
INFORMATION FROM AAA CO.LTD.

<MESSAGE>
We inform you that the facsimile ML4500 used by the business department of ABC Systems Co. Ltd., has a failure in the heater and thus printing operation is not possible. However, transmitting operation is possible.
Documents received but not yet output can be transferred to other facsimile device by a document transfer function. Please follow this instruction -> [TRANSFER OPERATION HELP]

Presently, the person-in-charge of service is preparing to visit your place for repairs.
We shall inform you about time and date of repairs before visiting your place. Please wait until we call you.
Please note that you are under maintenance contract and thus this repair is free of charge.

<GUIDES>
[NEW-PRODUCT INFORMATION]
[CAMPAIGN INFORMATION]

FIG.12

<TITLE>
  INFORMATION FROM AAA CO.LTD.

<MESSAGE>
  We inform you that three years has elapses since the purchasing date of the facsimile ML4500 used by the business department of ABC Systems Co. Ltd., The number of received and transmitted by your facsimile has exceeded durable number of sheets of ML4500.

We inform you of a new purchasing and replacing campaign.
  Our products will be offered at 30% discount of the normal prices for one month from now.

[PICTURES AND INFORMATION ABOUT PRODUCTS UNDER CAMPAIGN]

<GUIDES>
  [NEW-PRODUCT INFORMATION]
  [CAMPAIGN INFORMATION]

SYSTEM FOR REPORTING STATUS OF AND OFFERING SERVICE TO AN IMAGE COMMUNICATION TERMINAL

BACKGROUND OF THE INVENTION

1. Field of the Invention

The present invention generally relates to a system for reporting status of and offering service to an image communication terminal, and particularly relates to such a system which can report statuses of an image communication terminal to a manager via a service center and can offer various services from the service center to the image communication terminal. The image communication terminal may be a photocopier, a facsimile device, a printing device or a complex device having information communication means via a network.

2. Description of the Related Art

Occasionally, an image communication terminal such as a photocopier, a facsimile device, a printing device and a complex device requires maintenance and replenishment of consumables. When there is a failure of one or more of the resources of the image communication terminal or there is a shortage of consumables such as toner, the user of the image communication terminal calls the service center to ask for maintenance by a service-person or for replenishment of the consumables.

Japanese laid-open patent application No. 2-51968 discloses a system for dealing with a case of shortage of the consumables such as toner. The user registers consumables under his possession into a list of consumables and when there is a shortage of the listed consumables, the user reports the registered list of consumables and information related to his terminal (e.g., telephone number) to the service center through facsimile communication so as to request for replenishment of the consumables from the service center.

Japanese laid-open patent application No. 7-170357 (Japanese patent No. 2744768) discloses a system for requesting maintenance by a service-person. When maintenance by a service-person is required due to an event such as a failure of a particular component of the image communication terminal, details of the failure is reported to the service center by a facsimile transmission.

Recently, there is a device such as an Internet facsimile for communicating documents by e-mails (electronic mails) on the Internet. Japanese laid-open patent application No. 10-207304 discloses a system for requesting replenishment of consumables and maintenance through Internet facsimile communication.

In this system, when a shortage of the consumables is detected, information reporting the shortage status is sent to a preregistered address by an e-mail. If the status of shortage becomes more serious and the consumables are still not replenished, the e-mail is retransmitted with a higher emergency level. When the device recovers from a shortage state, an e-mail reporting this is sent to the preregistered address.

Also, with this system, when a status requiring the service-person is detected, an e-mail is sent to a first address of a plurality of registered service center. If the status is not recovered within a certain period of time, an e-mail is sent to the next address. When the repair is completed, an e-mail reporting the completion of the repair is sent.

However, with such image communication terminal of the related art in which replenishment of the consumables and maintenance of the resource is reported, a replenishment request or a service-person call is made directly to the service center and not via a manager (person-in-charge of management of the company) managing the image communication terminal. Therefore, even if there are consumables stocked by the manager, the consumables may be delivered to the user of the image communication terminal from the service center without the manager knowing it, or, the service-person may visit the user for maintenance of the image communication terminal without the manager knowing it.

SUMMARY OF THE INVENTION

Accordingly, it is a general object of the invention to provide a system for reporting status of and offering service to an image communication terminal, which can obviate the problems described above.

It is another and more specific object of the present invention to provide a system for reporting status of and offering service to an image communication terminal in which when an e-mail reporting the information of the image communication terminal is sent from the image communication terminal to the service center, various information corresponding to the status report is reported from a WEB-site of the service center to the manager, thereby improving user-convenience by enabling the manager to readily know the status of the image communication terminal on the homepage and reducing service cost for the image communication terminal.

According to the present invention, there is provided a system for reporting status of and offering service to an image communication terminal, which system includes:

an image communication terminal; a manager personal computer connected to the image communication terminal via a network; and a service center connected to the image communication terminal via the network;

the image communication terminal including a registering part for registering an e-mail address of the manager, an e-mail address of the service center and identification information of the image communication terminal; an e-mail controlling part for exchanging e-mails via the network; and a status detecting part for detecting statuses of the image communication terminal.

The service center receives and registers the identification information and the e-mail address of the manager from the image communication terminal.

When statuses of the image communication terminal detected by the status detecting part are sent from the image communication terminal to the service center by the mail controlling part using an e-mail, various information corresponding to the statuses are informed to the manager through a WEB (World Wide Web) site of the service center.

With the above system, when an e-mail reporting an information of the image communication terminal is transmitted from the image communication terminal to the service center, various information corresponding to the status is sent to the manager from the WEB-sit of the service center. Thus, the manager can easily know the status of the image communication terminal on the homepage. Therefore, the manager informs the state of the image communication terminal to the service center by referring to the homepage and can give appropriate handling corresponding to the state of the image communication terminal. As a result, convenience for the user (the manager and the user of the image communication terminal) can be improved while reducing the service cost for the image communication terminal.

BRIEF DESCRIPTION OF THE DRAWINGS

FIG. 2 is a diagram showing an example of how image communication terminal information, manager information and service center information are registered according to an embodiment of the present invention.

FIG. 3 is a flowchart showing reporting process of consumables and service maintenance of an embodiment of the present invention.

FIGS. 4A and 4B are flowcharts showing a process performed when the service center receives an e-mail from the image communication terminal.

FIG. 5 is a flowchart showing a process preformed when the manager receives an e-mail from the service center.

FIG. 6 is a diagram showing a screen display of the image communication terminal in a toner shortage state and an example of an reporting e-mail format from the image communication terminal to the service center.

FIG. 7 is a diagram showing a screen display of the image communication terminal in a heater failure state and an example of an reporting e-mail format from the image communication terminal to the service center.

FIG. 8 is a diagram showing an example of an reporting e-mail format from the service center to the manager, which is sent in a toner shortage state.

FIG. 9 is a diagram showing an example of an informing e-mail format from the service center to the manager, which is sent in a heater failure state.

FIG. 10 is a diagram showing details of displayed information on the HP represented by the URL in the toner shortage state.

FIG. 11 is a diagram showing details of displayed information on the HP represented by the URL in the heater failure state.

FIG. 12 is a diagram showing details of displayed information on the HP represented by the URL which is displayed based on counter data.

DETAILED DESCRIPTION OF THE PREFERRED EMBODIMENTS

Figure 1:
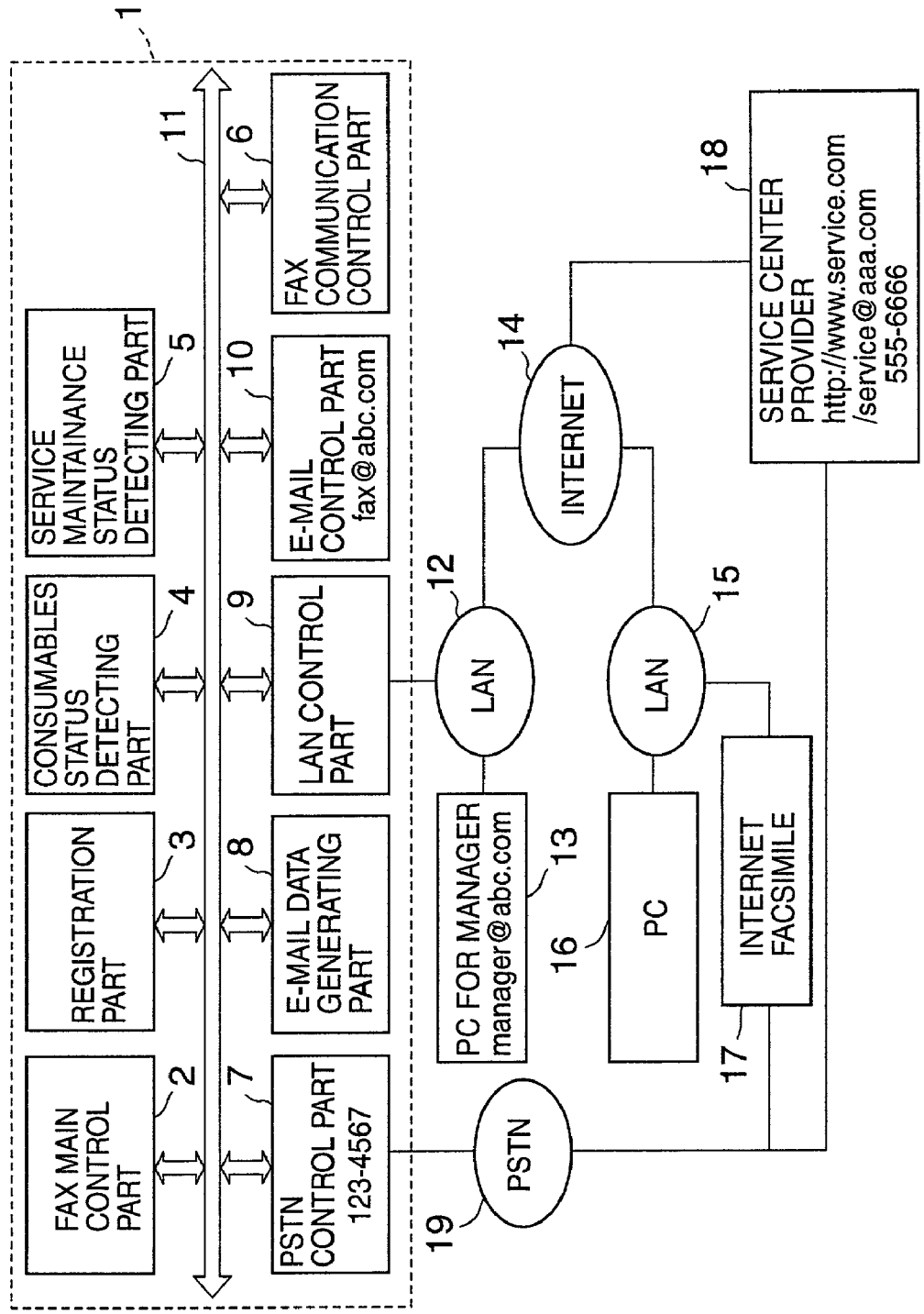
FIG. 1 is a block diagram showing a system configuration of an embodiment of a system for reporting status of and offering service to an image communication terminal.

In the following, principles and embodiments of the present invention will be described with reference to the accompanying drawings.

FIGS. 1 to 12 are diagrams showing an embodiment of a system of the present invention for reporting status of and offering service to an image communication terminal. The present embodiment may be applied to a complex machine capable of sending/receiving data via e-mail and facsimile communication, a photocopier, a printing device or an Internet facsimile. However, an Internet facsimile will be taken as an example in the following description.

Firstly, the configuration of the system of the present invention will be described. FIG. 1 shows an Internet facsimile 1 serving as an image communication terminal. The Internet facsimile 1 includes a facsimile main control part 2, a registration part 3, a consumables status detecting part 4, a service maintenance status detecting part 5, a facsimile communication control part 6, a PSTN (Public Switched Telephone Network) control part 7, an electronic mail (e-mail) data generating part 8, a LAN (Local Area Network) control part 9, an electronic mail (e-mail) control part 10. All of the elements shown by reference numerals 2 to 10 are connected by a bus 11.

The LAN control part 9 is connected to a manager PC (Personal Computer) 13 via a LAN network 12 which is connected to the Internet 14.

Also, the Internet 14 is connected to a PC 16 of another user and to an Internet facsimile 17 via a LAN network 15. The Internet 14 is also connected to a service center provider (hereinafter referred to as a service center) 18. The service center 18 is connected to the PSTN control part 7 of the facsimile 1 via the PSTN (Public Switched Telephone Network) 19.

With the system of the present embodiment, the facsimile 1 and the manager PC 13 perform e-mail communication via a mail server (not shown) provided on the LAN network 12. The manager PC 13 performs e-mail communication via the Internet 14 and the facsimile 1 and the service center 18 perform e-mail communication via the PSTN 19.

Note that the e-mail communications between the manager PC 13 and the service center 18 are implemented in a known manner. That is to say, SMTP transmissions and POP3 receptions are performed with the mail server provided on the LAN network 12.

Also, there may be a plurality of manager PCs. This is because there may be a plurality of managers in the office who are in charge of managing the facsimile 1.

On the other hand, the facsimile main control part 2 includes elements such as a CPU (Central Processing Unit), a ROM (Read Only Memory), a RAM (Random Access Memory), a DCR (Data Compression and Reconstruction) scanner, a plotter, an image memory and an operation display part.

The facsimile main control part 2 controls the facsimile 1 such that the facsimile 1 performs a sequence as a facsimile and also other various processes such as a replenishment reporting process of consumables such as toner, a maintenance reporting process of a resource such as a heater, an e-mail handling process for transmitting a toner replenishment request and an e-mail handling process for transmitting a service-person maintenance-failure request order.

A control process program executed by the CPU is stored in the ROM installed in the facsimile main control part 2. In the present embodiment, programs for performing a consumables-replenishment request informing process and a resource maintenance-failure status informing process are also stored in the ROM.

The RAM can temporarily store various data required for the CPU to execute the control process program and serves as a work area of the CPU.

The DCR is provided for reducing time and improving efficiency of transmission of image information. The DCR compresses (encodes) image information upon transmission and reproduces (decodes) encoded image information to the original information upon reception.

A scanner may be an image scanner utilizing elements such as CCDs (Charge Coupled Devices). The scanner scans the original according to an instruction from the CPU and reads an image data of the original at a predetermined resolution.

The plotter part may include a recording device of an electrophotography type provided with a photosensitive drum or toner. The plotter part records the received image data on a recording paper.

The image memory accumulates images read by the scanner or images received.

The operation display part includes a liquid crystal display and various operation keys such as an operation key for performing various operations upon facsimile transmission, an operation switch for inputting various information (such as an e-mail address) related to e-mails, an indicator part for displaying a toner empty indication when replenishment of consumables such as the toner is required and an indicator part which emits light when there is a need for maintenance or there is a failure of a resource such as a heater.

The registration part 3 stores e-mail address of the manager PC 13 as shown in FIG. 2, and thus serves as manager registration means. The registration part 3 also stores e-mail address and facsimile number of the service center 18 where consumables can be ordered from, and thus serves as service center registration means.

The registration part 3 also stores serial number, an e-mail address, a facsimile number and a caller ID information (terminal identification information including TTI (Transmitter Terminal Identification) information of the facsimile and the telephone number), and thus serves as identification information registration means.

The registration part 3 also stores order detail information related to the service center 18. The order detail information may include data such as type of toner, content of the service and status (toner-near-empty, etc.)

The consumables status detecting part 4 includes, for example, a remaining toner detecting sensor which detects an amount of the remaining toner and outputs a signal to the facsimile main control part 2. In the present embodiment, the consumables status detecting part 4 serves as status detecting means and consumables detecting means. The consumables are not limited to toner but may be any other article that is consumable.

The service maintenance status detecting part 5 may include a detector for detecting the status of a heater for heating a fixing roller for fixing a toner image onto a recording sheet, such as a sensor for detecting a voltage value of the heater. The service maintenance status detecting part 5 outputs signal to the facsimile main controlling part 2 when the voltage value of the heater is not within a certain range. In the present embodiment, the service status detecting part 5 serves as maintenance/failure detecting means.

The facsimile communication control part 6 performs the facsimile communication conforming to G3-protocol, since the facsimile 1 of the present embodiment is a G3-facsimile.

The PSTN control part 7 connects the facsimile 1 to the PSTN, and has an automatic call send/receive function.

The e-mail data generating part 8 generates data of an e-mail such that various information or templates registered in the registration part 3 or data of the original text scanned by the scanner is generated as e-mail data.

The LAN control part 9 connects the facsimile 1 to the LAN network 12 so as to provide a predetermined protocol between the manager PC 13 and the service center 18.

The e-mail control part 10 sends the e-mail generated in the e-mail data generating part 8 to the mail server via the LAN control part 9 by SMTP transmission. E-mails informing about the consumables and e-mails informing about maintenance/failure of the resource are sent to the mail server by SMTP transmission. In the present embodiment, the e-mail control part 10 serves as e-mail control means.

On the other hand, the service center 18 is a general service provider which 18 enables an e-mail service and a WEB-service on the Internet 14. The service center 18 also has a function of offering individualized homepages to the user by inputting personal information of the user (manager e-mail address, etc.,) using a main home page (hereinafter referred to as HP). The service center 18 can also be used to order products through a HP.

That is to say, the service center 18 includes terminal identification information and consumables information of the relevant terminal and is provided with means for introducing on the HP the consumables of the facsimile 1 provided at the user, means for the user to order consumables through the HP and means for informing on the HP the delivering time and date of the consumables. The service center 18 is also provided with means for introducing on the HP the terminal identification information of the facsimile 1, failure information or maintenance information of the relevant facsimile 1, information indicating time and date when the service-person is available and information related to new-product guide information. These means can be optionally set by a program software.

In the present embodiment, when the identification information registered in the registering part 3 and an e-mail address of the administrator is sent to the service center 18 upon installation of the facsimile 1, information related to the manager and the facsimile 1 are registered at the service center 18.

When the consumables status detecting part 4 and the service maintenance status detecting part 5 detect the status of shortage of the consumables or the status of the maintenance/failure of the facsimile 1 and when this is informed by an e-mail generated at the e-mail data generating part 8, the facsimile main control part 2 informs various information corresponding to the status information to the manager PC 13 via the WEB (World Wide Web) site of the service center 18.

E-mails or facsimile information on the Internet 14 may be other possible means for receiving information on the service center 18. The content of such information can be automatically identified if the information has a specific format for informing the status of consumables of the status of service maintenance/failure information of the facsimile 1.

The various information is informed from the service center 18 to the manager 13 by an e-mail attached with a URL (Uniform Resource Locator) of the HP to the manager. Thus, it is possible to know the status of the facsimile 1 on the HP by accessing the WEB-site using the URL obtained from the manager PC 13.

This HP can be used for introduction and ordering of the consumables and also includes the terminal identification information of the facsimile 1, failure information or maintenance information of the relevant facsimile, the information indicating time and date when the service-person is available and information related to new-product guide information.

When an operation such as replenishment of the toner or maintenance/repair of the heater is complete and an e-mail informing the completion is sent from the facsimile to the service center 18, the service center 18 deletes the messages on the HP which have been informed from the manager PC 13.

In the present embodiment, the facsimile main control part 2 and the LAN control part 9 serve as communication means.

Referring now to the flowcharts shown in FIGS. 3 to 5 and information messages illustrated in FIGS. 6 to 12, the operation of the present invention will be described.

Firstly, an operation carried out when the status of the toner of the facsimile 1 is at a near-empty and when there is a failure of the heater and thus a service maintenance is required will be described.

In FIG. 3, in accordance with the results obtained from the consumables status detecting part 4 and the service maintenance status detecting part 5, it is determined whether there is a change of the consumables status and the service maintenance status (step S1).

If the near-empty status of the toner is detected in accordance with the detection information from the consumables status detecting part 4, it is determined whether data such as terminal identification information, manager information and service center information have been registered (step S2). If such data have been registered, an e-mail for informing the fullness status of the consumables to the service center 18 is sent based on the data of the service center information (step S3). Then the toner-near-empty status is displayed on the display part of the facsimile main control part 2 as shown at the top of FIG. 6 (step S4).

As shown in FIG. 6, the e-mail includes information such as service maintenance information, counter information, user information and terminal information. This e-mail is generated at the e-mail data generating part 8, subjected to an e-mail sending process at the e-mail controlling part 10 and then sent to the mail server by an SMTP transmission via the LAN control part 9.

Referring again to FIG. 3, if the result of step S1 shows that maintenance of the heating roller is required in accordance with the detection information from the service maintenance status detecting part 5, it is determined whether data such as the terminal identification information, the manager information and service center information have been registered (step S5). If the data are registered, an e-mail informing the service maintenance status is sent to the service center 18 in accordance with the data such as the terminal identification information, the manager information and service center information (step S6). Then, it is determined whether the data should be displayed by the display part of facsimile main control part 2 (step S7). When it is necessary to display the data, a maintenance/repair mark is displayed as shown in FIG. 7 (step S8).

The e-mail generated here as shown in FIG. 7 is similar to that of FIG. 6 except that the line indicating "SERVICE CALL: HEATER ERROR" is different from what is shown at the lower part of FIG. 6.

Then, the processes performed at the service center 18 will be described with reference to the flowchart shown in FIGS. 4A and 4B.

In FIG. 4A, it is determined whether the service center 18 has received an e-mail from the facsimile 1 (step S11). If the result is YES, it is determined whether the e-mail informs the shortage of the consumables (step S12). If the result is YES, the database is searched based on this e-mail to retrieve information such as user-destination information, URL of the user-specific HP, user terminal type, consumables type, user-destination offering price and delivering time and date (step S13). Then the e-mail attached with the URL (see FIG. 8) is sent to the manager PC 13 (step S14). It is to be noted that all or part of such operations may be performed automatically.

If it is determined in step S12 that no e-mail related to the shortage of consumables has been received, it is determined whether an e-mail is received which indicates that service maintenance is required (step S15). When the result is YES, the database is searched based on this e-mail to retrieve information such as user-destination information, URL of the user-specific HP, user terminal type, error code type, user-destination service maintenance contract information and name of the person-in-charge at the user destination.

In the present embodiment, the user-destination information related to the device where there is a heater error is informed to person-in-charge of the service and these information messages are written into the user-specific HP (step S16). Then, an e-mail attached with the URL (see FIG. 9) s sent to the manager. It is to be noted that all or part of such operations may be performed automatically.

If it is determined in steps S12 and S15 that the e-mail does not indicate the toner-near-empty status or that there is a need for a maintenance of the heating roller, a normal e-mail process is performed (step S17). If it is determined in step S11 that the e-mail is not from the facsimile 1, a normal e-mail process is performed (step S18).

Referring now to FIG. 5, the processes performed by the manager PC 13 will be described.

In FIG. 5, it is determined whether the e-mail with the URL has been received from the service center 18 (step S21). If it is not an e-mail with URL, a normal e-mail process is performed (step S22).

If it is determined in step S21 that an e-mail with URL has been received, the manager reads this e-mail and accesses to the HP indicated by the URL (step S23). If this HP shows a screen as shown in FIG. 10, it is determined that there is a shortage of the toner (branch YES from step S24), and thus the shortage of the consumables of the facsimile 1 can be recognized while the user is at his desk.

When ordering the consumables based on the screen shown in FIG. 10, the user may check his stock of the consumables, replace or replenish the consumables, check the necessity of making an order of the consumables, check the delivering time and date and makes an order of the consumables on the HP, if necessary (step S25).

If it is determined in step S24 that the e-mail is not guidance information of the consumables, an HP indicated by the URL is accessed (step S26). If this HP shows a screen as shown in FIG. 11, the failure of the heating roller of the facsimile 1 can be recognized while the user is at his desk (branch YES from step S26).

Then, in order that a guidance is given by the HP, not the handling manual, about the fact that there is no influence on the transmitting operation, that the received document can be transferred and about the handling, the manager orders for the heating roller on the HP (step S27), and terminates the process. This HP can be used for checking the service maintenance fee.

If it is determined in steps S24 and S26 that the e-mail is not guidance information of consumables or not guidance information of service maintenance, when a screen as shown in FIG. 12 is displayed, operations such as accessing to information such as new-product information, catalog request and ordering are performed (step S28) and the process terminates. This screen shows an HP which is informed to the manager PC 13 when information is sent by an e-mail from the WEB-site when introducing new-products based on counter information of the facsimile 1 and information indicating time-period elapsed since the date of installation of the terminal.

At the service center 18, the above-mentioned various screens are referred to and a catalog ordering process (ordering of the heating roller), a consumables ordering process and other service request processes are performed as shown in step S31 of FIG. 4B.

After these processes, when the toner is correctly set at the facsimile 1, the toner replenishment indication of the operating part of the facsimile main control part 2 is deleted and a normal standby indication is displayed. Also, an e-mail informing the recovery from the service maintenance status is sent to the service center 18.

At the service center 18, when the e-mail informing the recovering is received at steps S11 and S12, the messages on the HP are cleared and the process is terminated.

When replacing the heating roller, the service-person calls the user of the facsimile 1 and then visits and repairs the facsimile 1. After the repair is completed, the service maintenance status detecting part 5 performs a transition from a service maintenance necessary state to a service maintenance complete state. The display indication of heater failure is deleted and returns to a normal standby display and an e-mail is sent to the service center 18 to inform that the heater-failure state has been recovered.

At the service center 18, when an e-mail informing the recovery is received at steps S11 and S12, the messages on the HP are cleared (step S19) and the processes is terminated.

In the present embodiment, an Internet facsimile device having an e-mail function is taken as a terminal-side device. However, information transmission from the service center to the manager can be achieved by the normal G3 facsimile device if the state of the information communication terminal is informed to the service center via the PSTN network.

Thus, according to the present embodiment, when an e-mail informing the information of the facsimile 1 is sent from the facsimile 1 to the service center 18, various information corresponding to the status information can be informed from the WEB site of the service center 18 to the manager PC 13. Accordingly, the manager can easily know the status of the facsimile 1 on the HP. Therefore, the manager informs the state of the facsimile 1 to the service center by referring to the homepage and can give appropriate handling corresponding to the state of the facsimile 1. As a result, convenience for the user (the manager and the user of the facsimile 1) can be improved while reducing the service cost for the facsimile 1.

Also, in the present embodiment, various information from the service center 18 is informed to the manager PC 13 by an e-mail with URL of the homepage which is sent to the manager. Therefore, the manager can be aware of the fact that there is some change of the status of the facsimile 1 by an e-mail sent from the service center 18 and can also know and deal with the status of the facsimile 1 by accessing the homepage using the URL of the homepage sent to the manager.

Since the shortage status of the consumables of the facsimile 1 is reported as the status information of the facsimile 1 reported from the service center 18 to the manager PC 13, the manager can easily check the shortage status on the homepage and make an order. Therefore, it is possible to prevent directly ordering further consumables from the service center 18 while there are still some consumables in stock. Therefore, excessive cost can be reduced and the manager can deal with the ordering of the consumables as budgeted.

The service center 18 is configured such that it introduces the terminal identification number of the facsimile 1 and information related to the type of consumables specific to the device and when the user orders the consumables on the HP, time and date of delivery of the consumables is informed on the HP. Accordingly, the manager can order lacking consumables of the facsimile 1 on the HP. Therefore, the manager can order the consumables as budgeted and the service cost can be reduced.

Also, as status information of the facsimile 1 reported from the service center 18 to the manager PC 13, the maintenance/failure status of the facsimile 1 is reported from the service center 18 to the manager. Accordingly, the manager can easily check the maintenance/failure status on the HP and deal with it. Therefore, the manager can be aware of the maintenance/failure status of the facsimile 1 in real-time, and thus unnecessary checking of the maintenance/failure status between the manager and the facsimile 1 can be avoided.

Also, the service center 18 is configured to introduce on the HP the terminal identification information of the facsimile 1, failure information or maintenance information of the relevant facsimile 1, information indicating time and date when the service-person is available and information related to new-product guide information. Thus, the manager can easily obtain the failure information and the maintenance information (e.g., counts of the counter and elapsed years) of the facsimile 1 and information indicating time and date when the service-person is available. Also, it is possible to consider purchasing of the new-products by referring to the maintenance information.

Further, when the replenishment of the consumables is complete or when the maintenance/repair of the resource is complete, an e-mail informing the completion is sent from the facsimile 1 to the service center 18. The service center 18 is configured such that the messages on the HP informed from the manager are deleted upon sending the e-mail. Therefore, by accessing to the HP of the service center 18, the manager can easily be aware of the fact that an operation on the facsimile 1 has completed.

Further, the present invention is not limited to these embodiments, and variations and modifications may be made without departing from the scope of the present invention.

The present application is based on Japanese priority application No. 2001-011837 filed on Jan. 19, 2001, the entire contents of which are hereby incorporated by reference.

What is claimed is:

1. A system for providing service to an image communication terminal, said system comprising:
    a manager computer;
    a service center; and
    an image communication terminal connected via a network to said manager computer and to said service center, said image communication terminal including
        a registering part for registering an e-mail address of said manager computer, an e-mail address of said service center and identification information of said image communication terminal, and
        a status detecting part for detecting a status of said image communication terminal,
    wherein said image communication terminal transmits to said service center a first e-mail including said identification information and status of said image communication terminal and said e-mail address of said manager computer,
    when said service center receives said first e-mail from said image communication terminal, said service center generates a message in a home page of said manager computer, based on said first e-mail from said image communication terminal, and transmits a second e-mail, which includes a URL (uniform resource locator) of said home page, to said manager computer, and
    said manager computer displays said message, based on the URL of the home page included in said second e-mail.

2. The system of claim 1, wherein said image communication terminal further includes a maintenance/failure detecting part for detecting necessity of maintenance or failure status of said image communication terminal,
    wherein when said maintenance/failure detecting part detects a state where maintenance or repair is necessary, said first e-mail from said image communication terminal to said service center includes maintenance/failure status information, and said service center in turn includes said maintenance/failure status information in said message generated in the home page of said manager computer.

3. The system of claim 2, wherein said service center further includes in said message generated in the home page of said manager computer, information indicating time and date when a service-person is available for performing maintenance or repair.

4. The system of claim 2, wherein said image communication terminal sends a third e-mail informing completion of maintenance/repair, and upon reception of said third e-mail said service center deletes the message informing said maintenance/failure status from the home page of said manager computer.

5. The system of claim 1, wherein said image communication terminal further includes a consumables detecting part for detecting a shortage status of consumables of said image communication terminal, and when said consumables detecting part for detects a shortage of one or more of the consumables, said first e-mail from said image communication terminal to said service center includes information indicating the shortage of said one or more of the consumables, and said service center in turn includes in said message generated in the home page of said manager computer, information for ordering said one or more of the consumables through the home page.

6. The system of claim 5, wherein after said one or more of the consumables are ordered utilizing the information in said message generated in the home page of said manager computer, said service center generates an additional message in the home page of said manager computer informing time and date of delivery of the ordered consumables.

7. The system of claim 5, wherein said image communication terminal sends a third e-mail informing replenishment of said consumables, and upon reception of said e-mail, said service center deletes the message informing said shortage status of consumables from the home page of said manager computer.

8. The system of claim 1, wherein said service center further includes in said message generated in the home page of said manager computer, new-product guide information.

9. The system of claim 1, wherein said service center also transmits said second e-mail to said image communication terminal.

10. A server apparatus connected via a network to a manager computer and to an image communication terminal, for providing service to said image communication terminal, said server comprising:

an e-mail service part configured to receive a first e-mail from said image communication terminal, extract, from said first e-mail, identification information and status information of said image communication terminal and e-mail address of said manager computer, and transmit a second e-mail to said e-mail address of said manager computer; and a message posting service part configured to generate a message in a home page of said manager computer, based on said first e-mail from said image communication terminal, wherein said second e-mail includes a URL (uniform resource locator) of said home page of said manager computer, allowing viewing of said message by utilizing the URL of the home page included in said second e-mail.

11. The server apparatus of claim 10, wherein when said first e-mail from said image communication terminal to said service center includes maintenance/failure status information, said message posting service part includes said maintenance/failure status information in said message generated in the home page of said manager computer.

12. The server apparatus of claim 11, wherein said message posting service part further includes in said message generated in the home page of said manager computer, information indicating time and date when a service-person is available for performing maintenance or repair.

13. The server apparatus of claim 11, wherein upon reception of a third e-mail informing completion of maintenance/repair, said message posting service part deletes the message informing said maintenance/failure status from the home page of said manager computer.

14. The server apparatus of claim 10, wherein when said first e-mail from said image communication terminal to said service center includes information indicating shortage of one or more of the consumables, said message posting service part includes in said message generated in the home page of said manager computer, information for ordering said one or more of the consumables through the home page.

15. The server apparatus of claim 14, wherein after said one or more of the consumables are ordered utilizing the information in said message generated in the home page of said manager computer, said message posting service part generates an additional message in the home page of said manager computer informing time and date of delivery of the ordered consumables.

16. The server apparatus of claim 14, wherein upon reception of a third e-mail informing replenishment of said consumables, said message posting service part deletes the message informing said shortage status of consumables from the home page of said manager computer.

17. The server apparatus of claim 10, wherein said e-mail service part also transmits said second e-mail to said image communication terminal.

18. A method for providing services via a network to an image communication terminal, said method comprising:

extracting from a first e-mail from said image communication terminal, identification information and status information of said image communication terminal and an e-mail address of a manager computer;

generating a message in a home page of said manager computer, utilizing the information from said first e-mail from said image communication terminal; and transmitting a second e-mail to said e-mail address of said manager computer, wherein said second e-mail includes a URL (uniform resource locator) of said home page of said manager computer, allowing viewing of said message by utilizing the URL of the home page included in said second e-mail.

19. The method of claim 18, further comprising, when said first e-mail from said image communication terminal includes maintenance/failure status information, inserting said maintenance/failure status information in said message generated in the home page of said manager computer.

20. The method of claim 19, further comprising inserting in said message generated in the home page of said manager computer, information indicating time and date when a service-person is available for performing maintenance or repair.

21. The method of claim 19, further comprising, upon reception of a third e-mail informing completion of maintenance/repair, deleting the message informing said maintenance/failure status from the home page of said manager computer.

22. The method of claim 18, further comprising when said first e-mail from said image communication terminal includes information indicating shortage of one or more of the consumables, inserting in said message generated in the home page of said manager computer, information for ordering said one or more of the consumables through the home page.

23. The method of claim 22, further comprising after said one or more of the consumables are ordered utilizing the information in said message generated in the home page of said manager computer, generating an additional message in the home page of said manager computer informing time and date of delivery of the ordered consumables.

24. The method of claim 22, further comprising, upon reception of a third e-mail informing replenishment of said consumables, deleting the message informing said shortage status of consumables from the home page of said manager computer.

25. The method of claim 18, further comprising inserting in said message generated in the home page of said manager computer, new-product guide information.

26. The method of claim 18, further comprising transmitting said second e-mail to said image communication terminal.

* * * * *